US007011040B2

(12) United States Patent
Marshall

(10) Patent No.: US 7,011,040 B2
(45) Date of Patent: *Mar. 14, 2006

(54) APPARATUS AND METHOD FOR ROTATING AVIAN ENCLOSURES

(75) Inventor: Patrick T. Marshall, Tipp City, OH (US)

(73) Assignee: BirdQuest, LLC, Tipp City, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/840,837

(22) Filed: May 7, 2004

(65) Prior Publication Data

US 2004/0216690 A1 Nov. 4, 2004

Related U.S. Application Data

(60) Division of application No. 10/698,298, filed on Oct. 31, 2003, which is a continuation-in-part of application No. 09/900,807, filed on Jul. 6, 2001, now Pat. No. 6,655,319, which is a continuation of application No. 09/480,936, filed on Jan. 11, 2000, now Pat. No. 6,363,891.

(60) Provisional application No. 60/164,451, filed on Nov. 10, 1999.

(51) Int. Cl.
A01K 29/00 (2006.01)

(52) U.S. Cl. ..................................... 119/57.9

(58) Field of Classification Search ...... 119/52.2–52.4, 119/57.8, 57.9
See application file for complete search history.

(56) References Cited

U.S. PATENT DOCUMENTS

| 5,979,859 A | * | 11/1999 | Vartanov et al. | 248/522 |
| 6,312,308 B1 | * | 11/2001 | Chen | 446/352 |
| 6,435,463 B1 | * | 8/2002 | Zezza | 248/322 |
| 6,651,364 B1 | * | 11/2003 | Hermanson et al. | 40/409 |

* cited by examiner

*Primary Examiner*—Thomas Price
(74) *Attorney, Agent, or Firm*—Martin & Associates, L.L.C.; Derek P. Martin

(57) ABSTRACT

An apparatus and method provide rotation of avian enclosures. In a first mode of operation, the apparatus automatically rotates the avian enclosure at a slow speed when a bird is detected, and automatically rotates the avian enclosure at a faster speed when a larger animal, such as a squirrel, is detected. In a second mode of operation, the apparatus may be controlled using a wireless remote control to perform a desired action. In a third mode of operation, the apparatus sends one or more signals via wireless transmission to a wireless notification device, which notifies a user of the presence of a bird or a larger animal. The user then has the option of using a wireless remote control to perform a desired action, which may include rotating the avian enclosure at a desired speed, stopping rotation of the avian enclosure, activating a beeper or vibrator, etc.

11 Claims, 13 Drawing Sheets

APPARATUS AND METHOD FOR ROTATING AVIAN ENCLOSURES

RELATED APPLICATIONS

This application is a Divisional of my earlier application of the same title, Ser. No. 10/698,298, filed on Oct. 31, 2003, which is a Continuation-In-Part (CIP) of my earlier patent application "APPARATUS FOR DETERRING ANIMALS FROM AVIAN ENCLOSURES", Ser. No. 09/900,807 filed on Jul. 6, 2001 now U.S. Pat. No. 6,655,319, which is a continuation of "METHOD FOR DETERRING ANIMALS FROM AVIAN ENCLOSURES", Ser. No. 09/480,936 filed on Jan. 11, 2000 now U.S. Pat. No. 6,363,891, which claims the benefit of U.S. Provisional Application No. 60/164,451 filed on Nov. 10, 1999. All of these related applications are incorporated herein by reference.

BACKGROUND OF THE INVENTION

1. Technical Field

The present invention generally relates to avian enclosures and accessories to avian enclosures. More specifically, the invention relates to apparatus and methods for rotating avian enclosures.

2. Background Art

One of main purposes of avian enclosures for their owners is the enjoyment of watching birds. Unfortunately, rodents consume large quantities of birdseed and, worst yet, destroy birdfeeders and birdhouses due to their aggressive nature. The most vulnerable feeders are the ones made out of plastic or wooden parts that squirrels will eventually chew on and destroy. As a result, people cannot enjoy watching birds at the same time while worrying about squirrels, or other rodents, damaging and/or scaring away birds from their feeders or houses.

Many attempts have been made in the prior art to develop, either internal or external to a birdfeeder, mechanisms that try to actively protect feeders by repelling rodents. Many of these use a cruel and inhumane electrical shock on the squirrels. For example, U.S. Pat. No. 5,191,857 to Boaz uses a large umbrella-shaped electrical shocking squirrel guard above the feeder. However, squirrels can get around this device simply by leaping onto the feeder from a nearby tree or from the ground. Other attempts shown by U.S. Pat. No. 2,856,898 to Doubleday et al., U.S. Pat. No. 5,937,788 to Boyd, and U.S. Pat. No. 5,471,951 to Collins all incorporate an electrical-shocking device within the feeder itself. However, defense mechanisms of these types can generally be figured-out by the squirrels who are both cunning and very determined. Over time, the squirrels train themselves where to step and where not to step in order to avoid getting shocked.

Other attempts in the prior art have tried more passive devices such as plastic baffles for deterring squirrels that are inherently designed to be very large and bulky devices. For example, U.S. Pat. No. 4,327,669 to Blasbalg, U.S. Pat. No. 5,642,687 to Nylen, and U.S. Pat. No. 4,031,856 to Chester all use some sort of large umbrella-shaped squirrel guard located either above and/or below the feeder. However, the effectiveness of these passive devices is even worse than the previously mentioned active devices since the squirrel will not only defeat the device, they will also destroy the device in the process by chewing on it repeatedly.

DISCLOSURE OF INVENTION

An apparatus and method provide rotation of avian enclosures. In a first mode of operation, the apparatus automatically rotates the avian enclosure at a slow speed when a bird is detected, and automatically rotates the avian enclosure at a faster speed when a larger animal, such as a squirrel, is detected. In a second mode of operation, the apparatus may be controlled using a wireless remote control to perform a desired action. In a third mode of operation, the apparatus sends one or more signals via wireless transmission to a wireless notification device, which notifies a user of the presence of a bird or a larger animal. The user then has the option of using a wireless remote control to perform a desired action, which may include rotating the avian enclosure at a desired speed, stopping rotation of the avian enclosure, activating a beeper or vibrator, etc.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
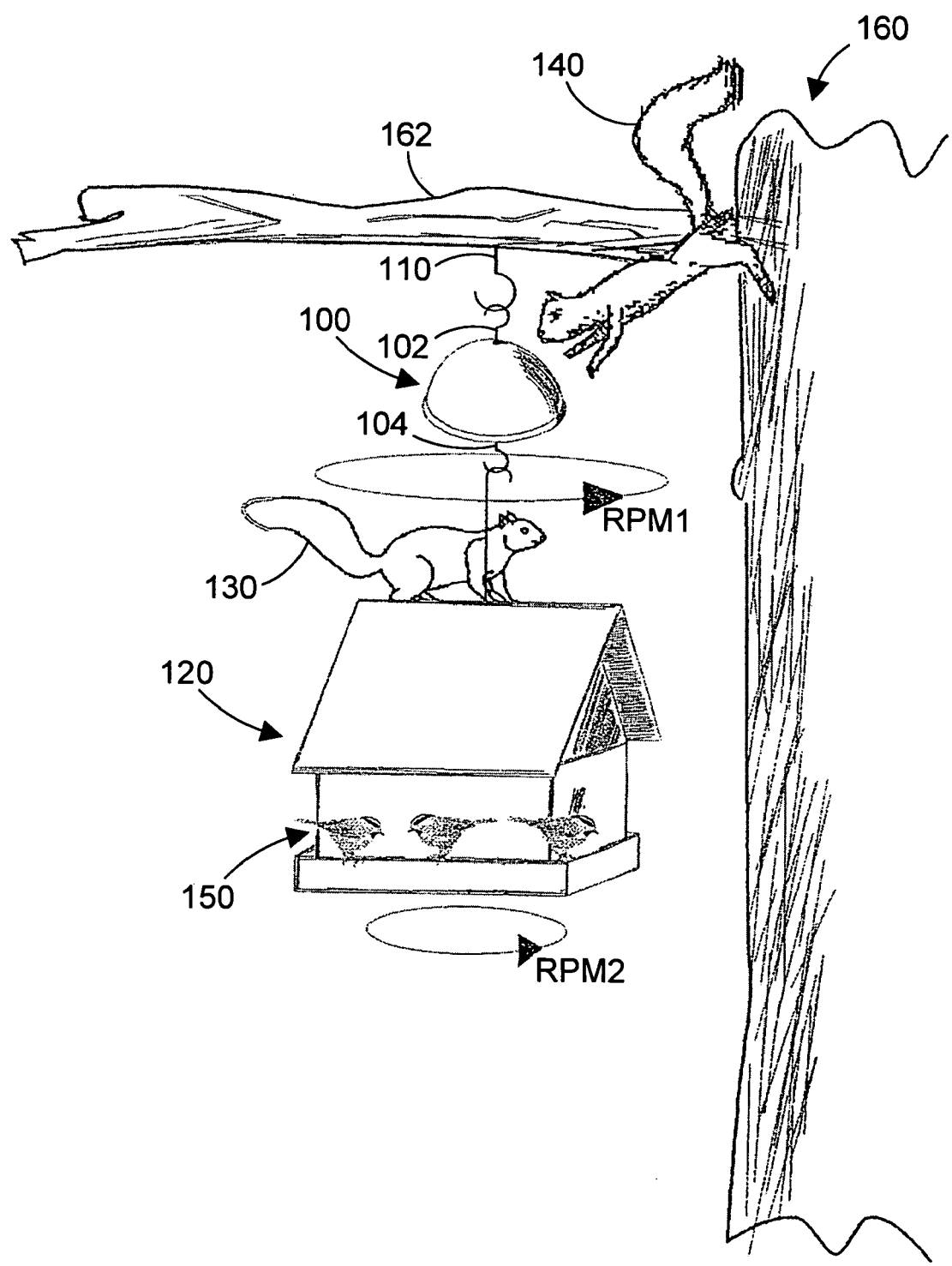
FIG. 1 is a perspective view of an apparatus in accordance with the preferred embodiments.

The present invention is directed to an apparatus and method of deterring rodents, such as squirrels, from avian enclosures by rotating the enclosures about their vertical axis. To accomplish this task, the rotating device must spin the feeder at a high enough revolutions-per-minute suitable to make the squirrel dizzy and/or nauseated. Through experimentation, a revolutions-per-minute of between 70 and 100 was found to make those squirrels that jump onto a feeder want to jump back off. Results so far have shown that, at these speeds, the squirrel becomes light-headed and/or agitated due to the significant centrifugal force generated from the rotating avian enclosure. Consequently, the squirrels always jump off after a brief period of time of usually less than 15 seconds. However, to be safe, the enclosure should be allowed to run at least one minute especially for battery-operated devices which may start to slow down after the batteries start to drain. In addition, it was found that squirrels generally will not try to board an already rotating feeder. So, as a result, an optimum system is one that senses the rodents prior to them jumping onto the feeder. The feeders can then be activated before the rodent even has a chance to eat any food.

The devices chosen to accomplish this method should also be flexible enough to rotate the enclosures at very slow speeds. This is desirable when birds land to allow the birdwatcher to see all sides of their enclosure. The rotational speed has to be slow enough to not scare away the birds. Through experimentation, it was found that a rotational speed of less than about six revolutions-per-minute will usually suffice in not scaring off any birds perched on the rotating feeder. However the revolutions-per-minute speed should not be too low as to become almost boring to watch. As a result, it was determined that about a three revolutions-per-minute is a safe and yet interesting rotational speed.

The electrical and/or mechanical rotating device ultimately chosen for this invention should take some or all of the above specifications into account. Also for the convenience of the user, the device may function without user intervention. For example, the device should have the capability to sense when the rodents or birds are on the feeder and discriminate between the two in order to decide whether to rotate the feeder fast or slow. Also for the convenience of the user, the device can have a remote-control capability that notifies the birdwatcher when something is in their feeder. The birdwatcher should then have the flexibility to decide what to do next to, for example, rotate the feeder to a variably fast speed or activate a very loud buzzer. Lastly, since some rodents are very smart, the device, if it is hanging from a tree, should also have the capability to sense when a rodent is trying to climb down from above. Some possible electrical/mechanical apparatuses that meet the above specifications of the invention will now be described in detail.

Figure 2:
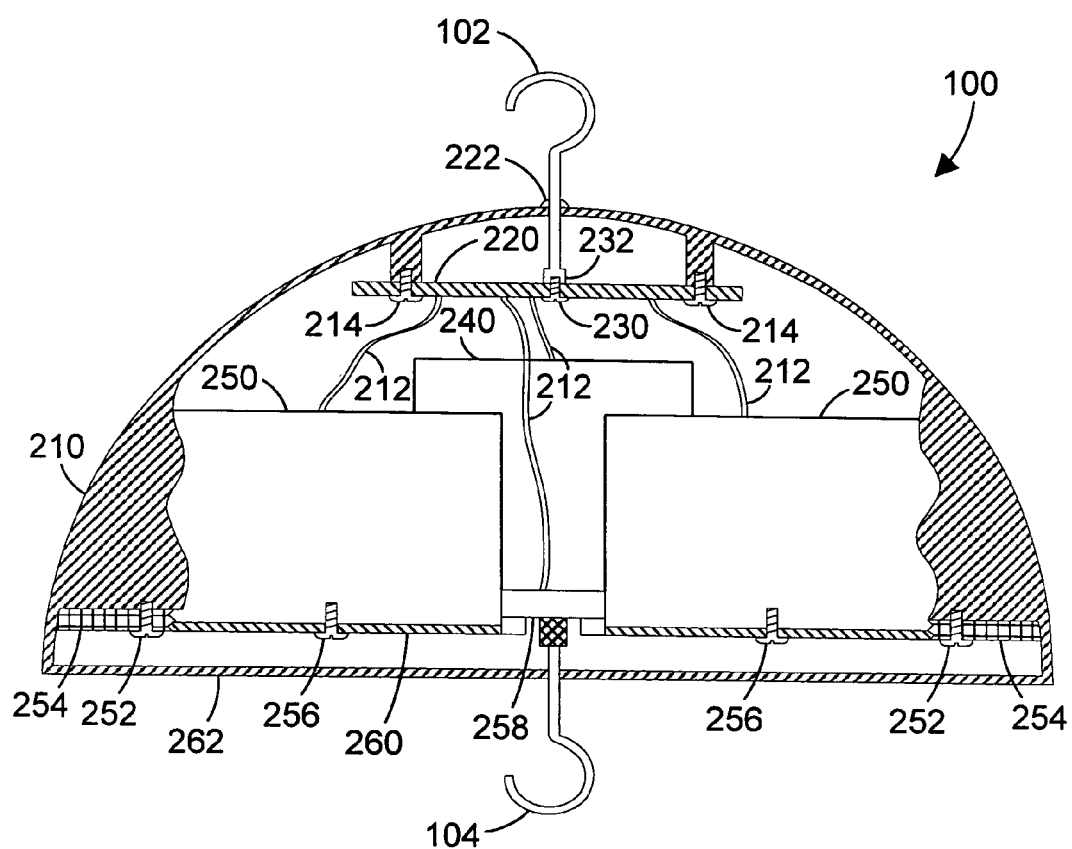
FIG. 2 is a cut-away cross-sectional side view of the apparatus of FIG. 1.

Referring to FIGS. 1 and 2 where a preferred embodiment of the invention, a hanging apparatus 100, is shown having a top hook 102 being suspended by a mounting hook 110 which is attached to suitable support such as a tree limb 162 which is part of a larger tree 160. A typical birdfeeder 120 is then hung from a bottom hook 104 attached to the hanging apparatus 100. Alternately the feeder 120 could be replaced by a birdhouse (not shown). When a single or plurality of birds 150 lands on the feeder 120, the presence of the birds 150 will be sensed by electronics contained within the hanging apparatus 100. The electronics will then activate a motor/gearbox (not shown) whose shaft is attached to the bottom hook 104 which will then, in turn, rotate the feeder 120 at a sufficiently slow revolutions-per-minute speed RPM2 as to not startle the birds 150. The electronics contained within the hanging apparatus 100 can also detect when a larger animal, such as a bottom squirrel 130, jumps onto the feeder 120. The hanging apparatus 100 will then rotate the feeder around in a circular fashion at a fast revolutions-per-minute speed RPM1 sufficient to make the bottom squirrel uncomfortable and jump back off the feeder 120. In another attempt, a top squirrel 140 climbs down onto the feeder 120 from above. However, he has to first apply his own body weight to the hanging apparatus 100. Electronics contained within the hanging apparatus 100 will again detect the force being applied to hanging apparatus's 100 outer shell and start to turn the feeder 120 at the fast speed RPM1. The top squirrel 140 will then be startled and not want to jump onto a rotating feeder 120 and will simply leave in frustration.

Refer now to FIG. 2 which illustrates a cutaway cross-sectional side view of the hanging apparatus 100. The top hook 102 is shown attached to a printed circuit board 220 that is populated with the electronics (not shown). The top hook 102 must be made of a suitably strong metal or other material to be able to support not only the hanging apparatus's 100 own weight, but also the weight of a large feeder completely filled with birdseed (not shown). The top hook 102 must also be strong enough to sustain the weight of the largest rodents (not shown) found here in the United States and abroad. Further, since the hanging apparatus 100 is to be used outdoors, the top hook 102 is preferably made of a material that will not rust, such as stainless steel. The top hook 102 includes an internally threaded portion 232, and is connected to the printed circuit board 220 by passing a small mounting screw 230 through a hole in printed circuit board 220 and screwing the screw 230 into the internally threaded portion 232 of hook 102. This small screw 230 is preferably a machine screw made of a suitably strong material to again support a wide range of loads. The small screw 230 must also be large enough to support a wide range of loads and yet small enough to allow the printed circuit board 220 to flex along its vertical axis due to varying loads. Likewise, the printed circuit board 220 is preferably made of suitably strong material such as fiberglass. The printed circuit board 220 is thick enough to again support a wide range of loads and yet be thin enough to allow flexing along its vertical axis due to varying loads.

The printed circuit board 220 is also shown in FIG. 2 attached to a housing 210 through the use of a couple of printed circuit board mounting screws 214. The diameter of the housing 210 is preferably sufficiently large to force top squirrels 140, shown in FIG. 1, to apply their own body weight to the housing 210 when stretching around the outside of the housing 210. The housing 210 can be injection molded using a plastic material such as a black acrylonitrile-butadiene-styrene or equivalent that is very durable outdoors and whose color will not fade over time. Furthermore, to prevent hardening and cracking over time, an ultraviolet stabilized curing agent should also be used in the manufacturing process of the housing 210. The printed circuit board mounting screws 214 are preferably made of suitable metal to support a wide range of loads. Also, their location is far enough away from the small screw 230 to allow the printed circuit board 220 to flex along its vertical axis due to varying loads. However, the vertical flexing of the printed circuit board 220 must never be allowed to exceed beyond its mechanical limits. For safety reasons, mechanical stops (not shown) may be employed to prevent the printed circuit board 220 from flexing beyond its maximum limits.

Shown also in FIG. 2 is a grommet 222 that is press-fitted into a hole at the top center of the housing 210 making a tight seal against the housing 210 and top hook 102 for preventing moisture from seeping into the hanging apparatus 100. This grommet 222 is preferably made of an elastic rubber or plastic or silicon rubber which will allow the grommet 222 to flex as varying loads are applied. Furthermore, the grommet must also be durable enough to not degrade or harden over time from extreme outdoor environments. Consequently an ultraviolet stabilized curing agent should be used in the manufacturing process of the grommet 222. In addition, the housing 210 is also shown having an extended overhang 262 to help protect all components, connected to a base plate 254, from rain, dust, sand, and snow. The base plate 254 is connected to the housing 210 using a multitude of base plate mounting screws 252. The overhang 262, which is part of the housing 210, preferably extends beyond the most protruding part not including the bottom hook 104 which is connected to the shaft of a motor/gearbox 240. For safety reasons, the bottom hook 104 is securely attached to the shaft of the motor/gearbox 240 for handling the largest of anticipated loads. Furthermore, the bottom hook 104 is preferably made of a suitably strong metal or other material to be able to support a large feeder completely filled with birdseed (not shown). The bottom hook 104 must also be strong enough to sustain the weight of the largest rodents found here in the United States and abroad. Further, since the hanging apparatus 100 is to be used outdoors, the bottom hook 104 is preferably made of a material that will not rust, such as stainless steel. Also shown in FIG. 2 are a plurality of electrical wires 212 which are electrically connected from the printed circuit board 220 to the motor/gearbox 240, to a plurality of battery holders 250, and to an electrical switch 258. The wires 212 are made of a suitable gauge wire to allow sufficient current to flow between the printed circuit board 220 and the aforementioned electrically connected components. Preferably, the battery holders 250 are plastic-injection molded as part of either the housing 210 or the base plate 254. In addition, the geometrical position of the battery compartments is symmetrically spaced to help stabilize the apparatus during rotation. As a result, the battery holders 250 are placed at equal-distances from each other and from the vertical axis through the center of the device. A plurality of battery access doors 260 are attached to the battery holders 250. Hinges (not shown) are used connect the doors 260 to the base plate 254. When closed, the doors 260 are secured to the base plate 254 using a plurality of battery cover screws 256.

Figure 3:
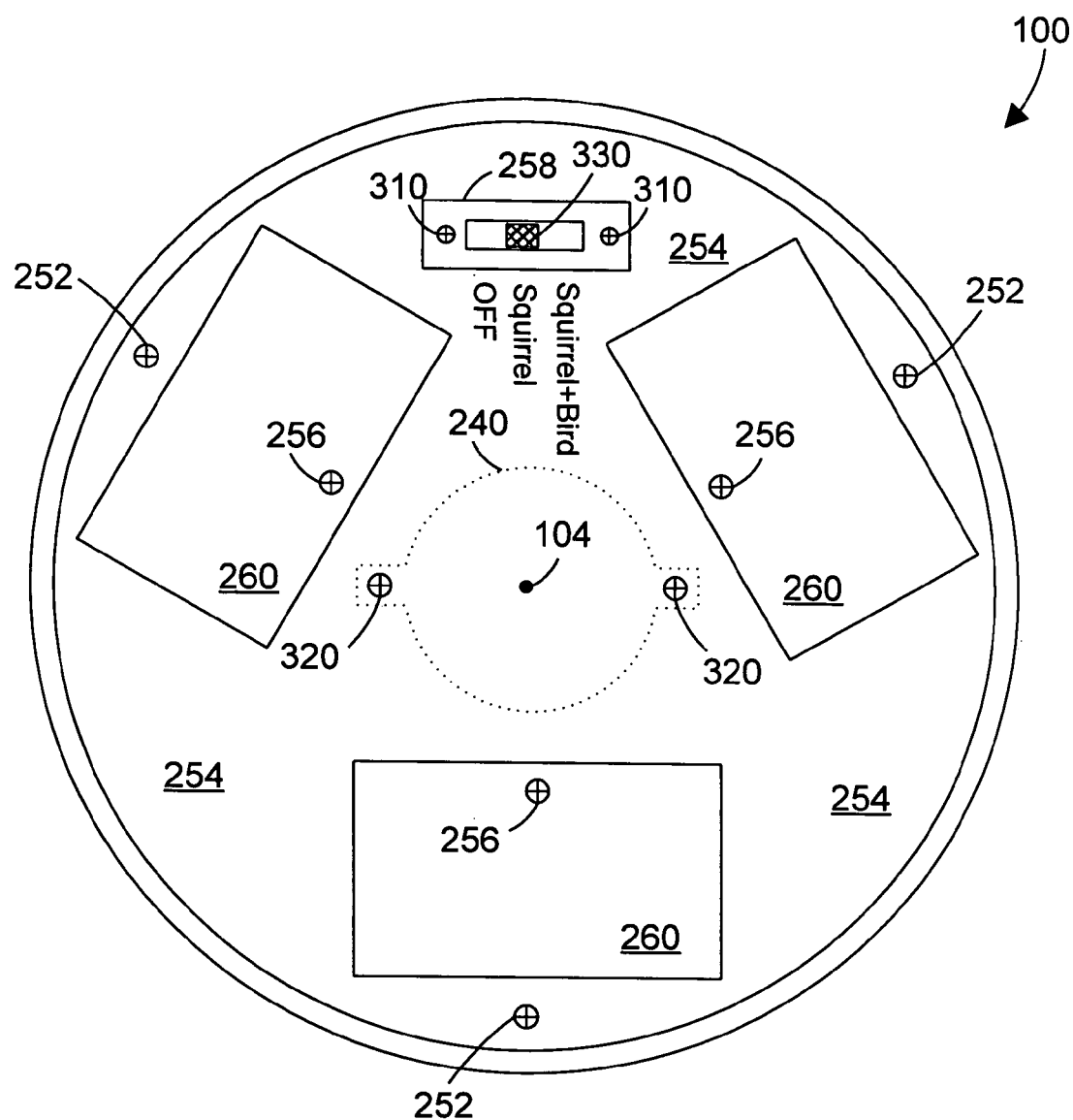
FIG. 3 is a bottom view of the apparatus of FIGS. 1 and 2.

FIG. 3 illustrates a bottom view of the hanging apparatus 100. As can be seen, a pair of electronic switch mounting screws 310 are used to secure the switch 258 to the base plate 254. The switch 258 is mounted towards the outside edges of the base plate 254 allowing easy access. Note that switch 258 includes a slider 330 that may be moved to any of three positions: 1) OFF, 2) Squirrel; and 3) Squirrel+Bird. The switch positions shown in FIG. 3 are specifically applicable to the first embodiment, explained in detail below with reference to FIGS. 4–8. The slider 330 is shown in FIG. 3 in the "Squirrel" position. Also shown in the figure are a pair of motor/gearbox housing mounting screws 320 which are used to secure the motor/gearbox 240 to the base plate 254. Most cracks (not shown) in the base plate 254 are sealed, for example, with silicone rubber, to prevent moisture from seeping into the hanging apparatus 100. However, some cracks (not shown) on the lowest portion of the base place 254 may be left purposely open to allow natural condensation buildup to seep out. This buildup of condensation typically occurs during the transitional periods between the seasons in geographic areas with two or more seasons. Lastly, all aforementioned screws in both FIG. 2 and FIG. 3 are preferably made of a sufficiently strong material that does not rust, such as stainless steel.

Figure 4:
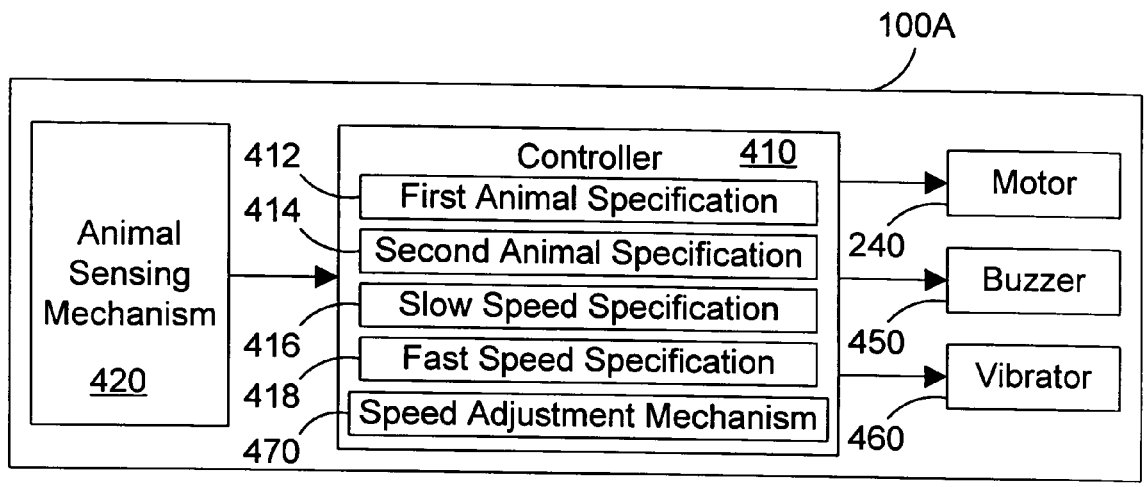
FIG. 4 is a functional block diagram of the apparatus of FIGS. 1–3 in accordance with a first embodiment.

Referring now to FIG. 4, a block diagram shows some of the components in apparatus 100A in accordance with a first embodiment of the present invention. Apparatus 100A represents one suitable variation of apparatus 100 shown in FIGS. 1–3. A controller 410 is coupled to an animal sensing mechanism 420, to a motor 240, to a buzzer 450, and to a vibrator 460. As discussed above with reference to FIG. 2, motor 240 may include a gearbox to achieve the desired speed of rotation of the motor shaft that is coupled to hook 104, and the term "motor" as used herein and in the claims expressly extends to both motors and motors with gearboxes. Animal sensing mechanism 420 is preferably a weight-sensing mechanism, such as a load cell. However, the preferred embodiments extend to any suitable implementation for animal sensing mechanism 420, including weight sensors, vibration sensors, sound sensors, motion sensors, mercury switches that detect a tilt, etc. In the most preferred implementation, animal sensing mechanism 420 is a load cell that delivers a signal to controller 410 that is proportional to the weight detected on hook 104 in FIG. 2. A simple and inexpensive load cell may be provided by bonding one or more strain gauges directly onto the printed circuit board 220 in FIG. 2 at points where the printed circuit board 220 flexes when weight is applied to housing 210 or to hook 104.

Buzzer 450 is an audio device that is provided to scare away unwanted animals. Buzzer 450 may be any suitable electronic buzzer or beeper, and may be activated to provide a constant buzz or beep, or may be activated to provide an intermittent buzz or beep. Buzzer 450 may also be used to provide an audible warning when there is a problem, such as low batteries, a feeder that cannot rotate (e.g., due to tree branches), etc. Vibrator 460 is likewise provided to scare away unwanted animals. Vibrator 460 causes the housing 210 and hook 104 to vibrate, which will typically aid in scaring away the unwanted animal. One suitable implementation for vibrator 460 is a small motor with an offset cam attached to its shaft that causes vibration when the motor is activated.

Controller 410 includes a first animal specification 412 and a second animal specification 414. In the load cell example, the first animal specification 412 may specify that animals of a first type (e.g., birds) are from 1 to 200 grams, and the second animal specification 414 may specify that animals of a second type (e.g., squirrels) are 200 grams or more. The controller also contains a slow speed specification 416 and a fast speed specification 418. Research has shown that a slow speed specification 416 of 3–6 revolutions per minute (RPM) allows turning an avian enclosure to view the birds without scaring the birds away. Research has also shown that a fast speed specification 418 of 70–100 RPM is sufficient to scare away squirrels. When an animal lands on the avian enclosure suspended from hook 104 in FIG. 2, or lands on the housing 210 of apparatus 100 in FIG. 2, the load cell that makes up animal sensing mechanism 420 will detect the increase in weight, and the controller will automatically cause the motor 240 to run at the slow speed if the detected animal is of a first type, and will cause the motor 240 to run at the fast speed if the detected animal is of a second type. In this manner, apparatus 100A automatically rotates at a slow speed when birds are present on the avian enclosure, and automatically rotates at a fast speed when squirrels or larger animals are present on the avian enclosure or on the apparatus.

Slow speed specification 416 and fast speed specification 418 may be fixed values. For example, slow speed specification 416 could be a fixed speed from 3–6 RPM and fast speed specification 418 could be a fixed speed from 70–100 RPM. Note, however, that one or both of slow speed specification 416 and fast speed specification 418 may include algorithms or heuristics that vary the speed of rotation. If the speed of rotation needs to be changed, the speed adjustment mechanism 470 is used. In one specific implementation, the slow speed specification 416 is set to a fixed value from 3–6 RPM, while the fast speed specification 418 begins at a relatively fast value, and increases speed at fixed time increments until the undesired animal jumps off the avian enclosure.

Figure 5:
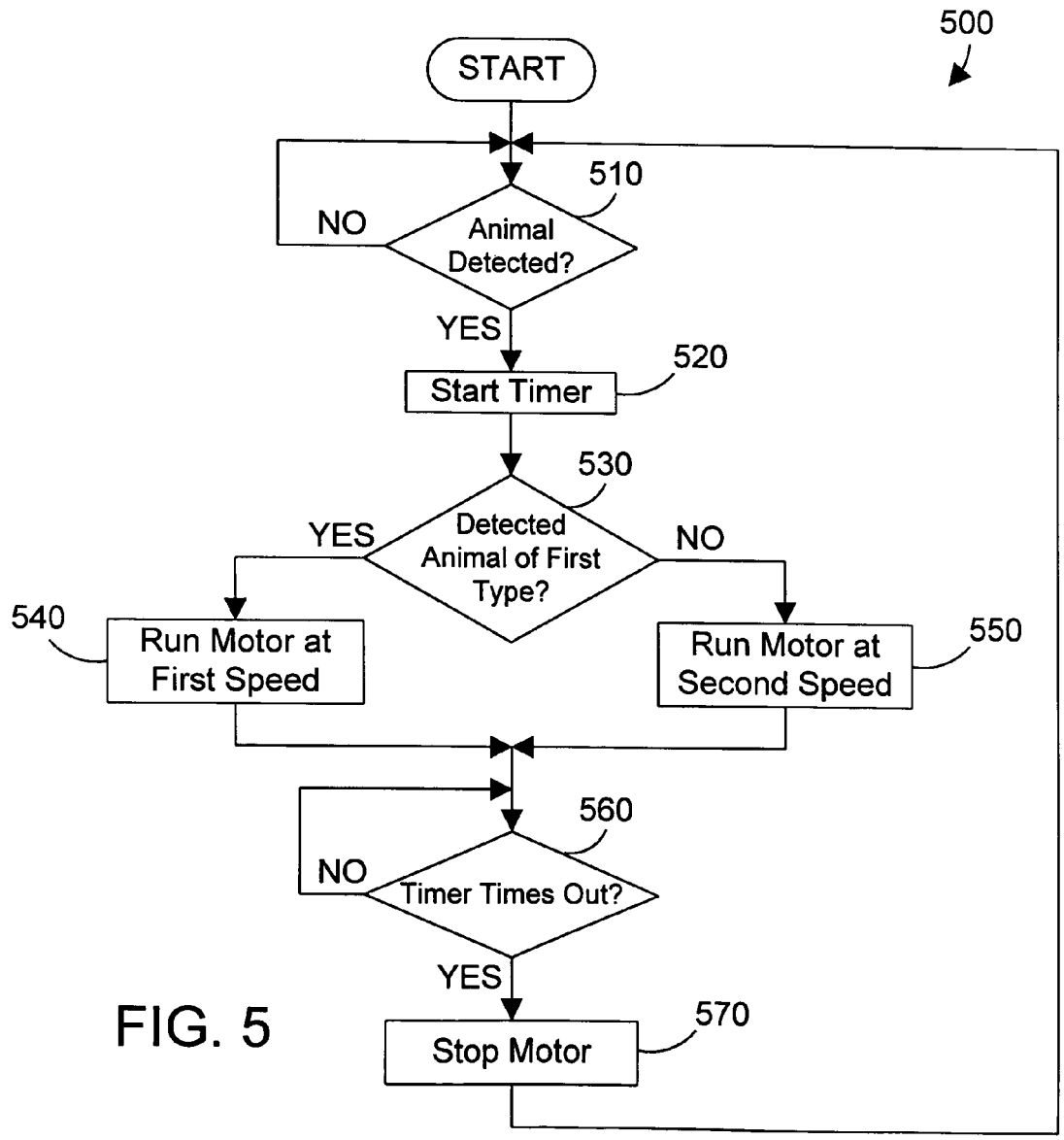
FIG. 5 is a flow diagram of a method performed by the apparatus of FIG. 4 in accordance with the first embodiment.

Referring to FIG. 5, a method 500 describes the steps performed by apparatus 100A in FIG. 4 in accordance with the first embodiment. We assume for this sample method 500 that slow speed specification 416 and fast speed specification 418 are both fixed values. Method 500 waits (step 510=NO) until an animal is detected (step 510=YES). Once an animal is detected, a timer is started (step 520). If the detected animal is of the first type (step 530=YES), the motor is run at the first speed (step 540). If the detected animal is of the second type (step 530=NO), the motor is run at the second speed (step 550). Method 500 then waits (step 560=NO) until the timer times out (step 560=YES). Once the timer times out, the motor is stopped (step 570), and method 500 loops back to step 510, waiting for another animal to be detected. The timer determines how long the motor will run. In the preferred embodiments, a timer value of approximately one minute has been found to be long enough that will generally assure that squirrels and other unwanted animals will leave the avian enclosure before the motor quits running, yet short enough to provide good battery life. Of course, it is within the scope of the first embodiment to provide different timer values depending on whether the detected animal is of the first type or second type. In this manner, the motor could be run at a slow speed for two minutes when a bird is detected, and could be run at a fast speed for fifteen seconds when a squirrel is detected.

Figure 6:
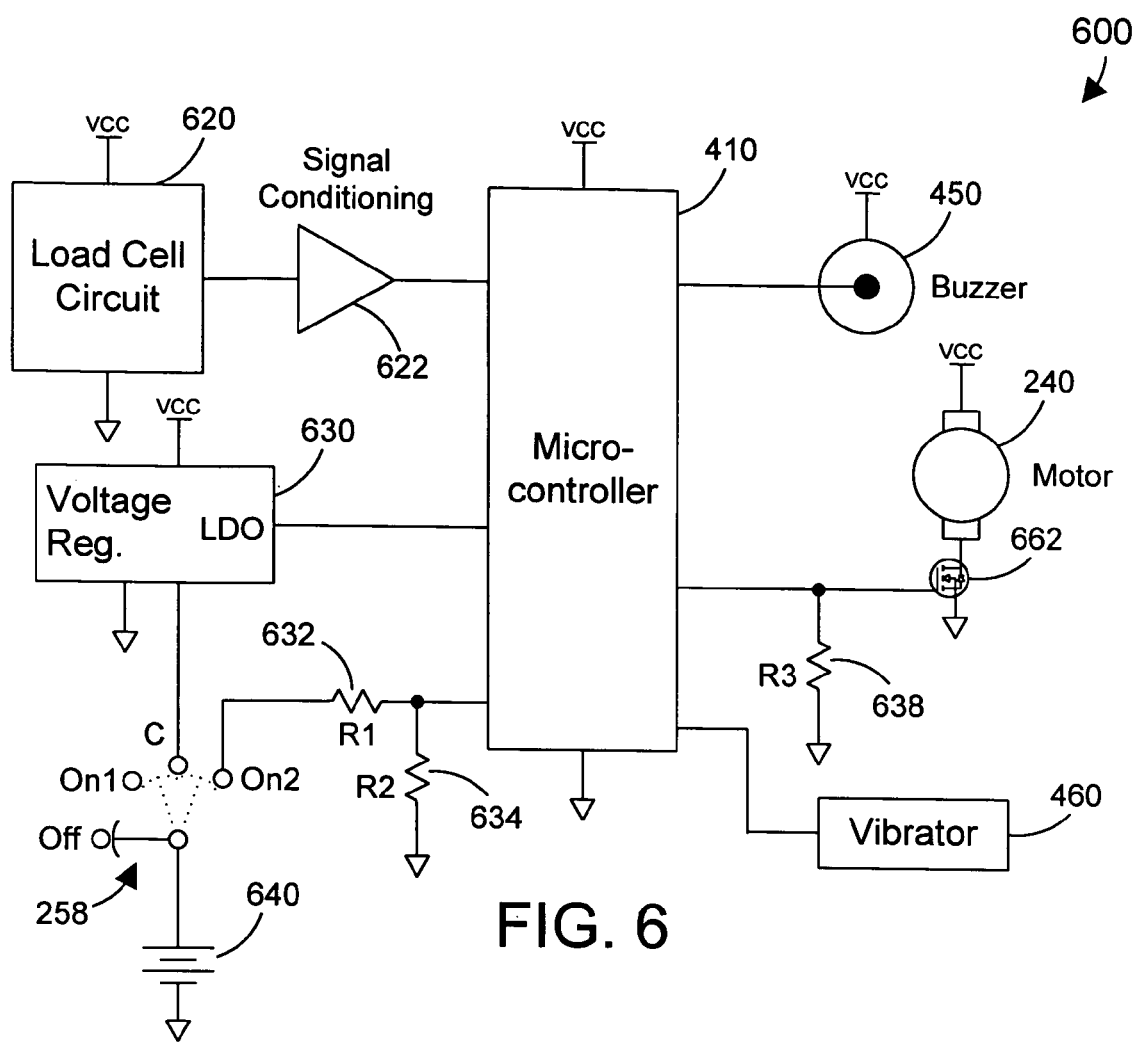
FIG. 6 is a detailed block diagram of an apparatus in accordance with the first embodiment.

Referring now to FIG. 6, an apparatus 600 is one specific implementation in accordance with the first embodiment for apparatus 100A in FIG. 4. Microcontroller 410 is coupled to a load cell circuit 620, to a voltage regulator 630, to a switch 258, to a buzzer 450, to a motor 240, and to a vibrator 460. Load cell circuit 620 is coupled to a signal conditioning circuit 622 to allow the microcontroller 410 to read the output of the load cell circuit 620. The load cell circuit 620 may include a single strain gauge mounted on the printed circuit board 220 of FIG. 2 at a point of flexing. In the alternative, the load cell circuit 620 may include multiple strain gauges mounted on the printed circuit board 220. Of course, one or more separate load cells, such as compression or beam load cells, may also be used that could be coupled in any manner within housing 210 such that weight applied to housing 210 or lower hook 104 is detected by the load cell circuit 620.

The voltage regulator 630 receives a voltage input from the battery 640 via switch 258 when the switch is in either of the On1 or On2 positions. The switch terminal that provides battery voltage to the voltage regulator 630 is labeled "C" in FIG. 6 to show that this terminal is common to both the On1 and On2 positions (which correspond to Squirrel and Squirrel+Bird, respectively, in FIG. 3). The voltage regulator 630 regulates the voltage from battery 640 and provides a regulated output VCC. Voltage regulator 630 also provides a low drop out (LDO) output to signal the microcontroller 410 when the battery voltage 640 has dropped to the point that the voltage regulator 630 can no longer regulate the output VCC. The LDO signal can thus be used to signal to the microcontroller 410 that the batteries 640 need to be replaced. In response, the controller may generate a specific pattern of beeps on buzzer 450 to alert the user that the batteries need to be replaced. Note that batteries 640 represent any suitable source of DC voltage. In the specific implementation shown in FIGS. 1–3, three "C" cells are used in series to provide a battery voltage of approximately 4.5 volts DC.

Buzzer 450 may be any suitable buzzer. In the preferred implementation of the first embodiment, buzzer 450 is a piezoelectric buzzer mounted directly to the printed circuit board 220. When buzzer 450 is a piezoelectric buzzer, the piezoelectric buzzer may be used as an input device that senses vibrations as well as an audio output device. Motor 240 is any suitable motor, and may include a suitable gearbox to provide the desired speeds of rotation for hook 104. Microcontroller 410 provides an output that drives a field-effect transistor (FET) 662 that acts as an electronically-controlled switch to complete the path between the ground terminal of the motor 240 and the circuit ground. A pull-down resistor R3 638 is provided to keep the motor 240 from turning on inadvertently before the pin of the microcontroller 410 drives the gate of FET 662 to a logic LOW. Vibrator 460, as discussed above, may be any suitable device that is capable of vibrating the hook 104 or the housing 210. The manner in which the microcontroller 410 drives the vibrator 460 depends on its specific configuration. For the example of a motor with an offset cam, the vibrator 460 could be driven in the same manner shown for motor 240.

The microcontroller 410 includes an input that is coupled to the On2 terminal of the power switch 258. This signal passes through a voltage divider circuit made up of resistors R1 632 and R2 634, to microcontroller 410. Note that switch 258 includes a contact wiper that is shown in solid lines in the OFF position, and is shown in phantom lines in the On1 and On2 positions. When the switch 258 is in the OFF position or in the On1 position, there is no connection from the battery 640 to the On2 terminal in the switch 258. As a result, the logic level on the input to the microcontroller 410 is LOW due to the pull-down resistor R2 634. When the switch 258 is in the On2 position, the voltage from battery 640 is coupled to the On2 terminal, which provides a logic HIGH on the input to the microcontroller 410. This input thus indicates to microcontroller 410 whether the switch 258 is in the On1 position or the On2 position. In the most preferred implementation, the On1 position is selected for fast rotation for rodents, while the On2 position is selected for fast rotation for rodents plus slow rotation for birds.

Figure 7:
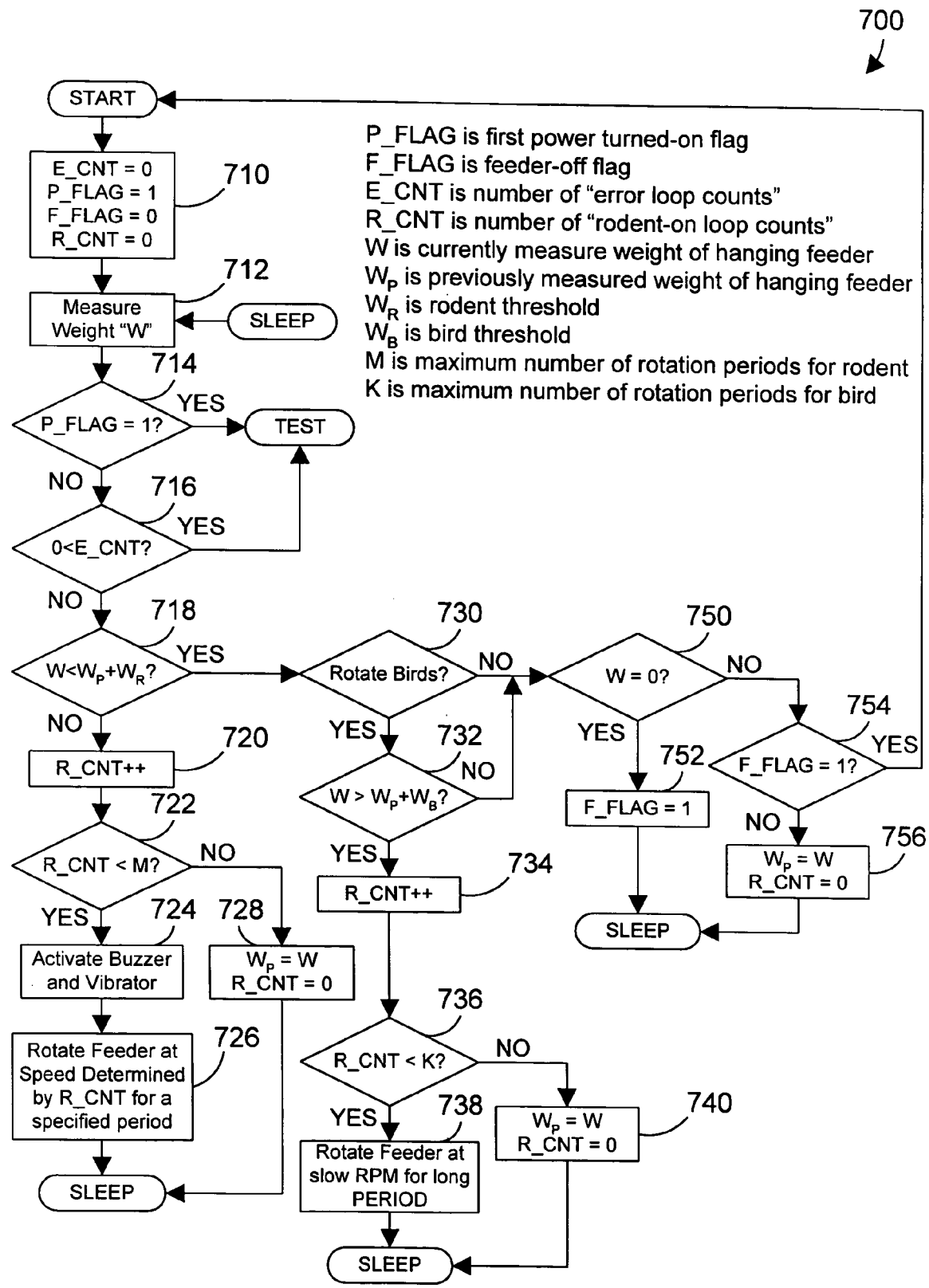
FIGS. 7 and 8 show different portions of a detailed flow diagram of a method performed by the apparatus of FIG. 6.
Figure 8:
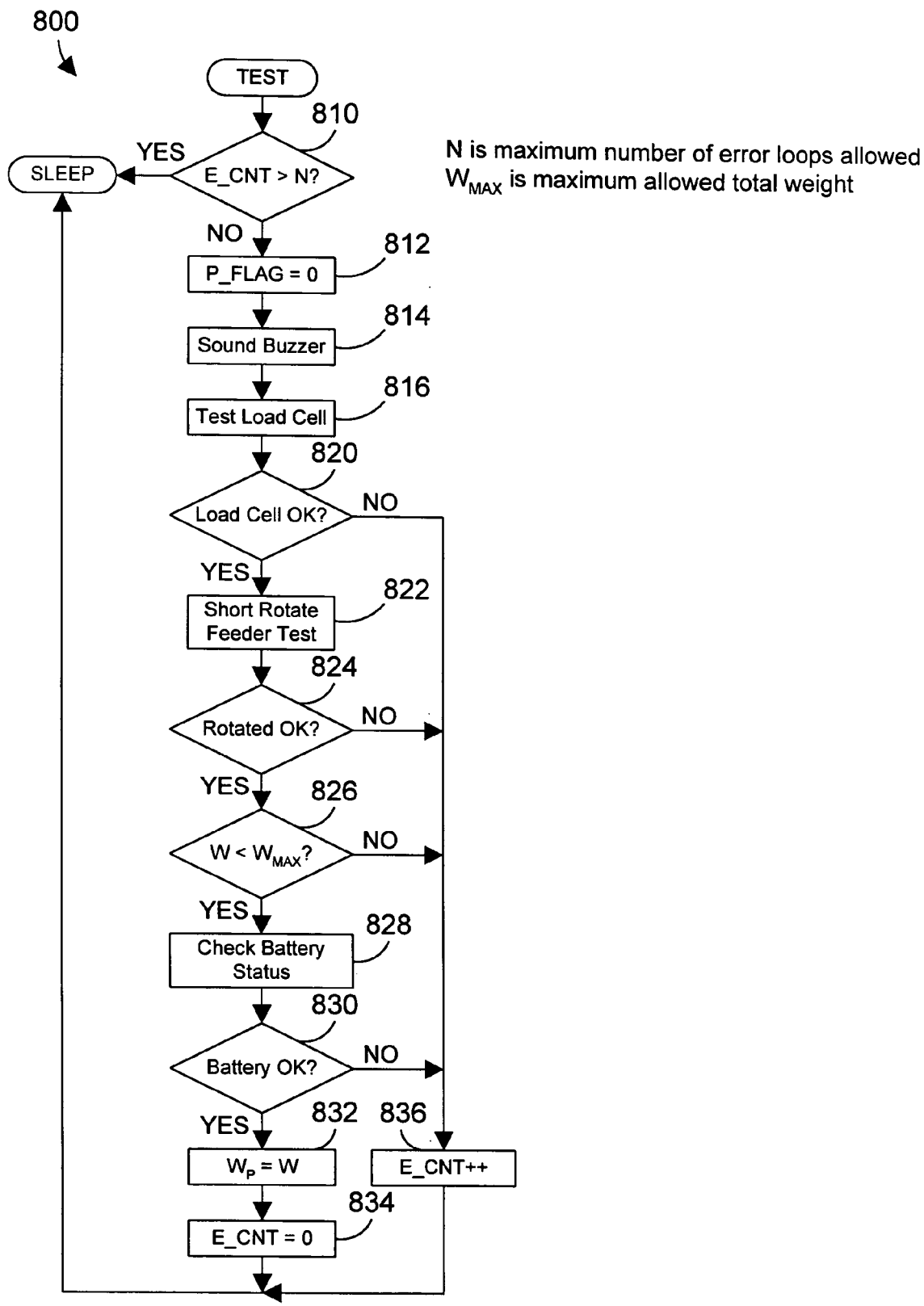

A detailed flow diagram for the apparatus 600 of FIG. 6 is shown in FIGS. 7 and 8. In step 710, all variables and flags are initialized to default values. The variables and flags are described at the top of FIG. 7. The current weight "W" is measured at step 712. Note that many steps in FIGS. 7 and 8 go to "SLEEP" mode. SLEEP mode is a mode that saves battery life by placing the controller 410 into a low power state. SLEEP mode preferably lasts only a few seconds (typically two). When sleep mode is exited, method 700 measures the current weight in step 712.

If P_FLAG is set (step 714=YES), the apparatus has just been powered up, so built-in tests need to be performed to assure the apparatus is functioning correctly. If P_FLAG is not set (step 714=NO), but the error count E_CNT is greater than zero (step 716=YES), the built-in tests need to be performed again. If the apparatus has not just been powered up (step 714=NO) and the error count is zero (step 716=NO), the weight is compared to the rodent threshold (which corresponds to the second animal specification 414 in FIG. 4) to determine whether the detected animal is a rodent (step 718). Step 718 determines whether the current weight "W" is less than the previous weight $W_P$ plus the rodent specification $W_R$. Using the numbers given above, we assume that a small bird weighs, for example, from 1 to 200 grams, and anything larger than 200 grams is an undesired animal. So step 718 determines whether the change in weight on the apparatus exceeds 200 grams. If so (step 718=NO), we know the animal is an undesired animal. The R_CNT value is incremented (step 720). If the R_CNT value is less than a specified maximum number of rotation periods for rodents M (step 722=YES), the buzzer and vibrator are activated (step 724) and the motor is activated at a fast speed determined by R_CNT for a predetermined period of time (step 726). After step 726, method 700 enters sleep mode. When method 700 exits sleep mode at step 712, we assume the P_FLAG is cleared (step 714=NO) and we assume the E_CNT is zero (step 716=NO). If the weight of the rodent is still there (step 718=NO), R_CNT is incremented again (step 720). If the number of rotation periods is less than the specified maximum for a rodent (step 722=YES), the buzzer and vibrator are activated again (step 724). At this point, the speed is increased by the speed adjustment mechanism 470 in FIG. 4 according to the increased value of R_CNT (step 726). Note also that the specified period in step 726 could be increased as a function of R_CNT as well.

A simple example will illustrate. Let's assume that M, the maximum number of rotation periods for a rodent, is set to 5. In this case, when a rodent is first detected, R_CNT is incremented to a value of one in step 720. One is less than five, so step 722=YES. The buzzer and vibrator are activated in step 724, and the feeder is rotated at a speed that is a function of R_CNT for some period of time that may also be a function of R_CNT. On the next iteration, R_CNT is incremented in step 720 to a value of two (step 720), which is still less than five (step 722=YES). Buzzer and vibrator are activated again (step 724), and the speed of rotation is increased in step 726 because the value of R_CNT increased from one to two. The same happens for the next two iterations, when R_CNT is incremented to values of three and four. On the fifth iteration, R_CNT is incremented to a value of five, so R_CNT is no longer less than M (step 722=NO). As a result, the previously measured weight of the feeder is set to the current weight, and R_CNT is reset to zero (step 728). We fashion the algorithm in step 726 such that we are generally assured that a rodent will no longer be on the feeder by the time R_CNT=M. However, if the rodent is still present when R_CNT=M, the previous weight $W_P$ is set to the current weight W, and R_CNT is set to zero. In effect, if the rodent is still present when R_CNT=M, method 700 gives up trying to spin the rodent off. As a result, when the weight W is measured in step 712 upon exiting sleep mode, method 700 will no longer detect that the rodent is present. This mode of operation saves batter life in the event that a stubborn squirrel somehow is able to hang on for M rotation periods.

Step 726 shows an algorithmic implementation for fast speed specification 418, where rotation begins at one speed and is incrementally increased for every rotation period. Note that the fast speed specification 418 in FIG. 4 can include variations in both speed and time. Thus, step 726 could start the feeder rotating at a fixed relatively fast speed for a short time period, and with each increase in speed, the time period is increased as well. The preferred embodiments expressly extend to any and all algorithms and heuristics for slow speed specification 416 and fast speed specification 418 (FIG. 4).

If the weight sensed in step 718 is less than the rodent specification (step 718=YES), method 700 checks to see if rotation for birds is enabled (step 730). If not (step 730=NO), method 700 checks to see if the feeder is off the apparatus (step 750). If so (step 750=YES), the F_FLAG is set to one (step 752) to indicate that the feeder is no longer on the apparatus. Method 700 then enters SLEEP mode. This loop will repeat itself until the feeder is set back on the bottom hook (104 in FIGS. 1–3). When this occurs (step 750=NO), and the status of F_FLAG is checked, and if F_FLAG is set, indicating the feeder was off the apparatus (step 754=YES), method 700 loops back to START for the purpose of reinitializing. The next time step 754 is performed, F_FLAG will be cleared (step 754=NO), the previous weight is set to the current weight, and the value of R_CNT is reset to zero (step 756). After this, method 700 enters into SLEEP mode. If the rotation for birds is enabled (step 730=YES), the weight is checked again to see if it is greater than the lower threshold for birds (step 732). If not (step 732=NO), method 700 continues at step 750. Otherwise (step 732=YES), the value of R_CNT is incremented (step 734). If R_CNT is less than K, which is the maximum number of rotation periods for a bird (step 736=YES), the feeder is rotated at a slow RPM for a long period of time (step 738). In this specific example, the slow RPM is a fixed slow speed specification 416, and the period of time is a fixed period of time. However, as discussed above, it is equally within the scope of the preferred embodiments to provide an algorithm for slow speed specification 416 that varies both time and speed of rotation. At this point, method 700 enters sleep mode. If the bird is still present when method 700 exits sleep mode in step 712, we assume the same path in the flow will be followed (step 714=NO, step 716=NO, step 718=YES, step 730=YES, step 732=YES) until R_CNT is incremented (step 734). This continues until R_CNT equals K (step 736=NO), at which point the previous weight is set to the current weight, and R_CNT is reset to zero (step 740).

Referring now to FIG. 8, a method 800 for performing built-in self tests begins by determining whether the error count E_CNT is greater than the maximum allowed error count N (step 810). If E_CNT is less or equal to N (step 810=NO), P_FLAG is set to zero (step 812), the buzzer is sounded (step 814), and the load cell is tested (step 816). If the load cell is OK (step 820=YES), the feeder is rotated for a short period to make sure the rotation works (step 822). If the feeder rotated OK (step 824=YES), the weight is checked to make sure it is less than the specified maximum $W_{MAX}$ (step 826). The battery is then checked (step 828) by checking the status of the LDO output of the voltage regulator. If LDO is not asserted, we know the battery voltage is okay (step 830=YES), the previous weight is set to the current weight (step 832), and the error count is reset to zero (step 834). At this point, method 800 enters SLEEP mode. If any error occurs, such as if the load cell is not OK (step 820=NO), if the feeder did not rotate (step 824=NO), if the detected weight is greater than the maximum allowable weight (step 826=NO), or if the battery is not OK (step 830=NO), the error count E_CNT is incremented (step 836), and method 800 then enters SLEEP mode.

If the error count E_CNT ever reaches a value that is greater than the maximum allowed error count N (step 810=YES), methods 700 and 800 will endlessly loop through steps 712, 714, 716=YES, and 810=YES. This loop will repeat itself until the owner (not shown) can help remedy the situation. The purpose of this is to conserve battery power. Once this state of idling due to excessive errors occurs, the preferred way to exit this loop is for the user to correct the problem and then cycle the power to the apparatus by turning the power switch off, then back on again. Of course, a separate reset switch could also be provided that allows method 700 to begin anew at step 710.

Figure 9:
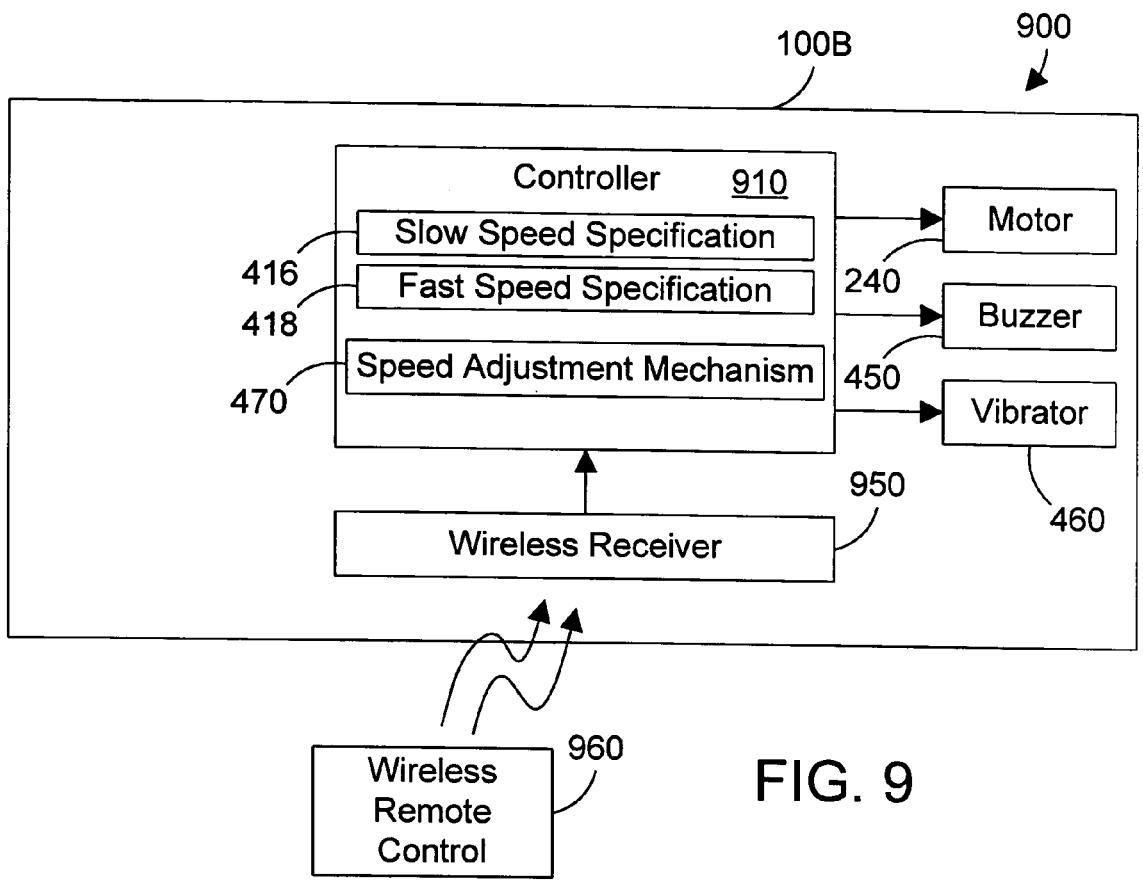
FIG. 9 is a functional block diagram of the apparatus of FIGS. 1–3 in accordance with a second embodiment.

A second embodiment of the present invention allows a user to control the apparatus via a wireless remote control. A system 900 in accordance with the second embodiment is shown in FIG. 9 to include an apparatus 100B and a wireless remote control 960. Apparatus 100B represents one suitable variation of apparatus 100 shown in FIGS. 1–3. Apparatus 100B includes a wireless receiver 950 that receives messages from a wireless remote control 960, and that passes those messages to the controller 910. In response, the controller 910 may perform one or more actions corresponding to the received message. Controller 910 includes a slow speed specification 416, a fast speed specification 418, and a speed adjustment mechanism 470.

The wireless remote control 960 may send different messages that tell the apparatus 100B to rotate the motor 240 at a slow speed determined by slow speed specification 416, to rotate the motor 240 at a fast speed determined by fast speed specification 418, to increase or decrease the speed of the motor 240 using speed adjustment mechanism 470, to stop rotation of the motor 240, to activate buzzer 450, or to activate vibrator 460. Note that buzzer 450 is one suitable example of an audio device that may be activated by controller 910. One of the purposes of buzzer 450 and vibrator 460 is to scare away animals. Thus, if a user sees an undesirable animal, such as a crow or a squirrel, on a bird feeder suspended from apparatus 100B, the user may press a button on the wireless remote control 960 that will cause the controller 910 to activate the buzzer 450 and/or vibrator 460 to scare away the undesirable animal. Note that the wireless communication between wireless remote control 960 and wireless receiver 950 may use any suitable form of wireless communication, including without limitation radio frequency (RF), infrared, and all other forms of wireless communication, whether currently known or developed in the future.

Figure 10:
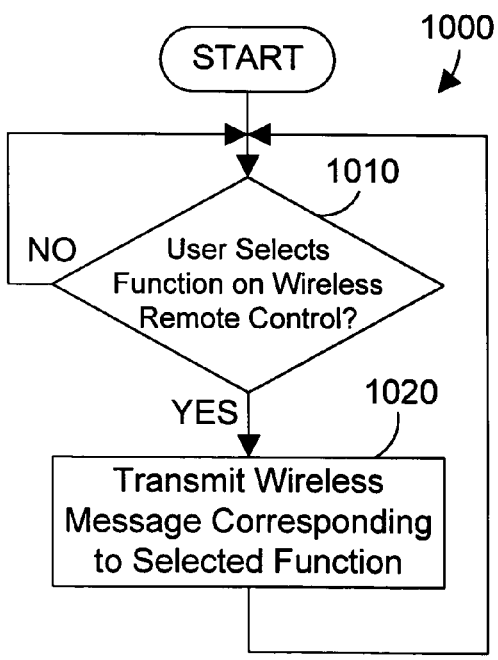
FIGS. 10 and 11 are flow diagrams of methods performed by the apparatus of FIG. 9 in accordance with the second embodiment.
Figure 11:
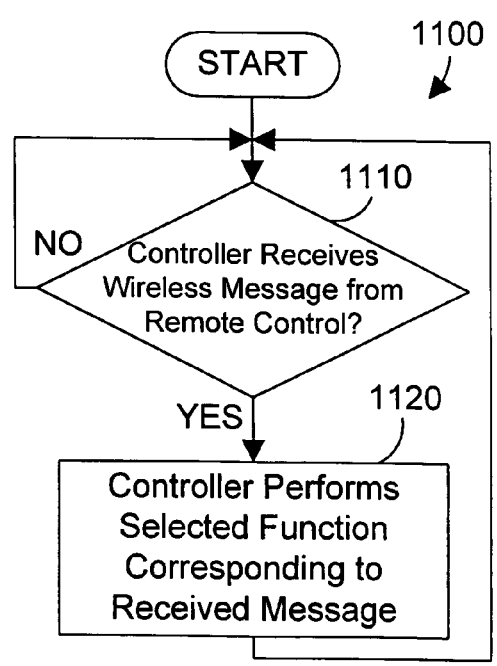

Referring now to FIG. 10, a method 1000 in accordance with the second embodiment is preferably performed by the wireless remote control 960 of FIG. 9. The wireless remote control 960 waits (step 1010=NO) until a user selects a function on the wireless remote control (step 1010=YES). The wireless remote control 960 then transmits a wireless message corresponding to the selected function (step 1020). Method 1100 in FIG. 11 represents a method that is preferably performed by the controller 910. The controller waits (step 1110=NO) until it receives a wireless message from the wireless remote control (step 1110=YES). The controller then performs the selected function that corresponds to the received message (step 1120). Thus, if the user selects to activate the buzzer 450 in step 1010 by pressing an appropriate button on the wireless remote control 960, the wireless remote control 960 transmits one or more messages that correspond to the "activate buzzer" action in step 1020. When the controller receives the "activate buzzer" message (step 1110=YES), the controller activates the buzzer 450 in step 1120.

Figure 12:
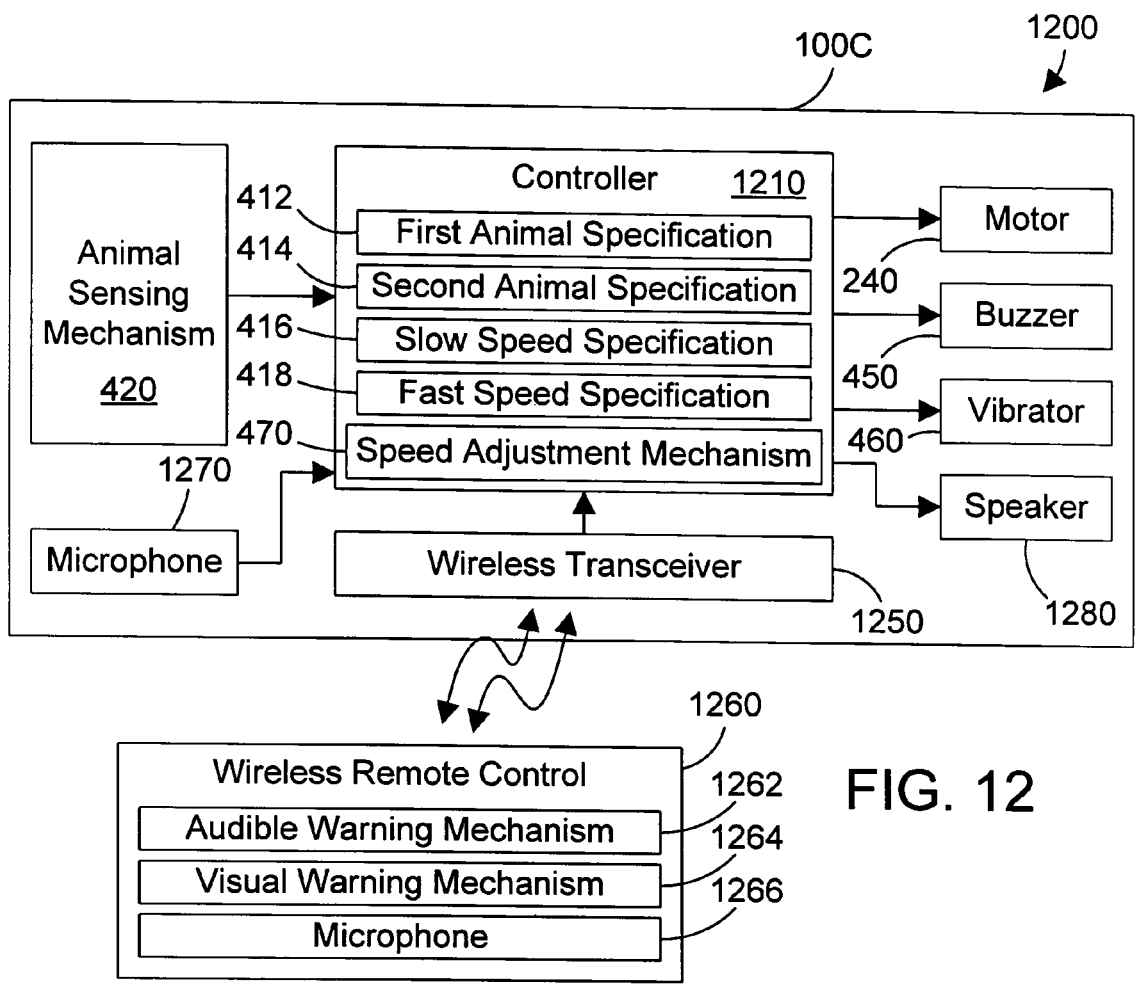
FIG. 12 is a functional block diagram of the apparatus of FIGS. 1–3 in accordance with a third embodiment.

A third embodiment of the present invention allows bidirectional communication between the apparatus and the wireless remote control. A system 1200 in accordance with the third embodiment is shown in FIG. 12 to include an apparatus 100C and a wireless remote control 1260. Apparatus 100C represents one suitable variation of apparatus 100 shown in FIGS. 1–3. Apparatus 100C in accordance with the third embodiment includes a controller 1210 that includes the first animal specification 412, second animal specification 414, slow speed specification 416, fast speed specification 418, and speed adjustment mechanism 470. Note that apparatus 100C includes the capability of communicating with a wireless remote control 1260, but in this third embodiment the communication between apparatus 100C and remote control 1260 is bidirectional. Wireless remote control 1260 preferably includes an audible warning mechanism 1262 and a visual warning mechanism 1264. The audible warning mechanism 1262 preferably provides beeps from the wireless remote control 1260 that inform the user when an animal is detected. The visual warning mechanism 1264 may include any visual display device, including without limitation light-emitting diodes (LEDs) and liquid crystal displays (LCDs).

The apparatus 100C may optionally include a microphone 1270 and a speaker 1280 coupled to the controller 1210, and may further include a microphone 1266 in the wireless remote control 1260. The microphone 1270 in apparatus 100C allows a user to hear the birds at the birdhouse or feeder. The controller 1210 can transmit the audio data received from microphone 1270 to the wireless remote control 1260, where the audio data may be played on a speaker or other audio device, such as the audible warning mechanism 1262. In this manner, when a bird is detected, a birdwatcher could enjoy hearing the song of the birds on the remote control 1260. Apparatus 100C may further optionally include a speaker 1280. A birdwatcher's voice picked up by microphone 1266 in the remote control may be transmitted to the apparatus 100C and played on the speaker 1280. In this manner, a birdwatcher could shout at an unwanted animal or provide other sounds in an attempt to scare the unwanted animal away.

The system 1200 shown in FIG. 12 may be programmed to provide any suitable form of notification to a user. In an area where birds are relatively rare, the user could program the system to provide a single beep when a bird is detected, and to provide three beeps when a squirrel is detected. In an area where birds are common, it might annoy the user to sound a beep each time a bird lands on the feeder, so the user could program no notification for birds but one or more beeps to alert for squirrels. The apparatus 100C allows a user to program his or her preferences for type of notification for the first and second types of animals.

In addition, the user may program system 1200 according to the user's preferences. For example, instead of using a three-position switch 258 as shown in FIG. 6, a simple ON/OFF switch could be used. When ON, the user could then program the apparatus according to the user's preferences. For example, to conserve battery life, the user may select no rotation when birds are detected, but fast rotation when squirrels are detected. In addition, the user could independently program the time period for both slow and fast rotation. The third embodiment expressly extends to the capability of allowing a user to program any and all functional parameters for system 1200, preferably using wireless remote control 1260.

Lastly, the user may wish to program system 1200, according to the user's preferences, to be notified when a particular bird species has been detected. This process is made possible by using standard digital signal processing (DSP) voice recognition algorithms. For example, the user may wish to be notified when the usually seasonal "gold finches" (not shown) have once again arrived in the near region. In this example, the user would select "Gold Finches" from the LCD display 1580 on the wireless remote control 1260 in FIG. 15. The remote 1260 would then program the system 1200 to "search" for audio signals that match the gold finches' specific "per-chick-o-ree" sounds. The system 1200 (FIG. 12) would then notify the wireless remote control 1260 via wireless communication when that particular bird species' "per-chick-o-ree" audio sounds have been recognized. The data required to accomplish this task could easily be digitized and stored into various look-up read-only memory (ROM) tables in either wireless remote control 1260 or system 1200 in FIG. 12.

Figure 13:
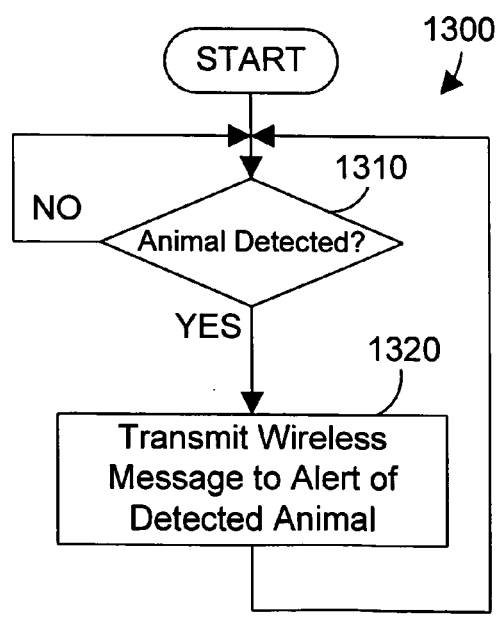
FIG. 13 is a flow diagram of a method performed by the apparatus of FIG. 12 in accordance with the third embodiment.

Referring to FIG. 13, a method 1300 in accordance with the preferred embodiments is performed by controller 1210 of FIG. 12. Method 1300 waits (step 1310=NO) until an animal is detected (step 1310=YES). The controller then transmits a wireless message to provide an alert of the detected animal (step 1320). Note that in FIG. 12, the wireless remote control 1260 receives the message sent by controller 1210 via wireless transceiver 1250, and provides an audible warning via audible warning mechanism 1262, a visual warning via visual warning mechanism 1264, or both. However, in an alternative embodiment, a receiver separate from wireless remote control 1260 may be used to provide any suitable type of user notification. For example, a receiver could have a plug that is plugged into a standard alternating current receptacle in a house, and could also have a receptacle that allows an electrical device, such as a lamp, to be plugged into the receiver. With the lamp turned on, the receiver could then use the lamp as a visual indicator of an animal on the feeder by having the visual warning mechanism 1264 selectively apply power to the receptacle on the receiver, thereby flashing the lamp. A slow flash could indicate a bird, while a fast flash could indicate a squirrel. The receiver could also be wired into the house wiring to selectively activate any desired circuit by the visual warning mechanism 1264 or audible warning mechanism 1262. For example, a hall light could be flashed by visual warning mechanism 1264 to indicate the presence of birds or squirrels. In addition, many doorbells that are commercially available have two different connections, which are intended to provide different sounds depending on whether the front doorbell or the back doorbell is rung. However, many homes do not have doorbells on their back doors. The audible warning mechanism 1262 could selectively activate the back door doorbell to provide an audible warning of birds and/or squirrels. The preferred embodiments expressly extend to any and all receivers that are capable of providing either an audible warning, a visual warning, or both, to a user, whether incorporated into wireless remote control 1260 or separate from wireless remote control 1260.

Figure 14:
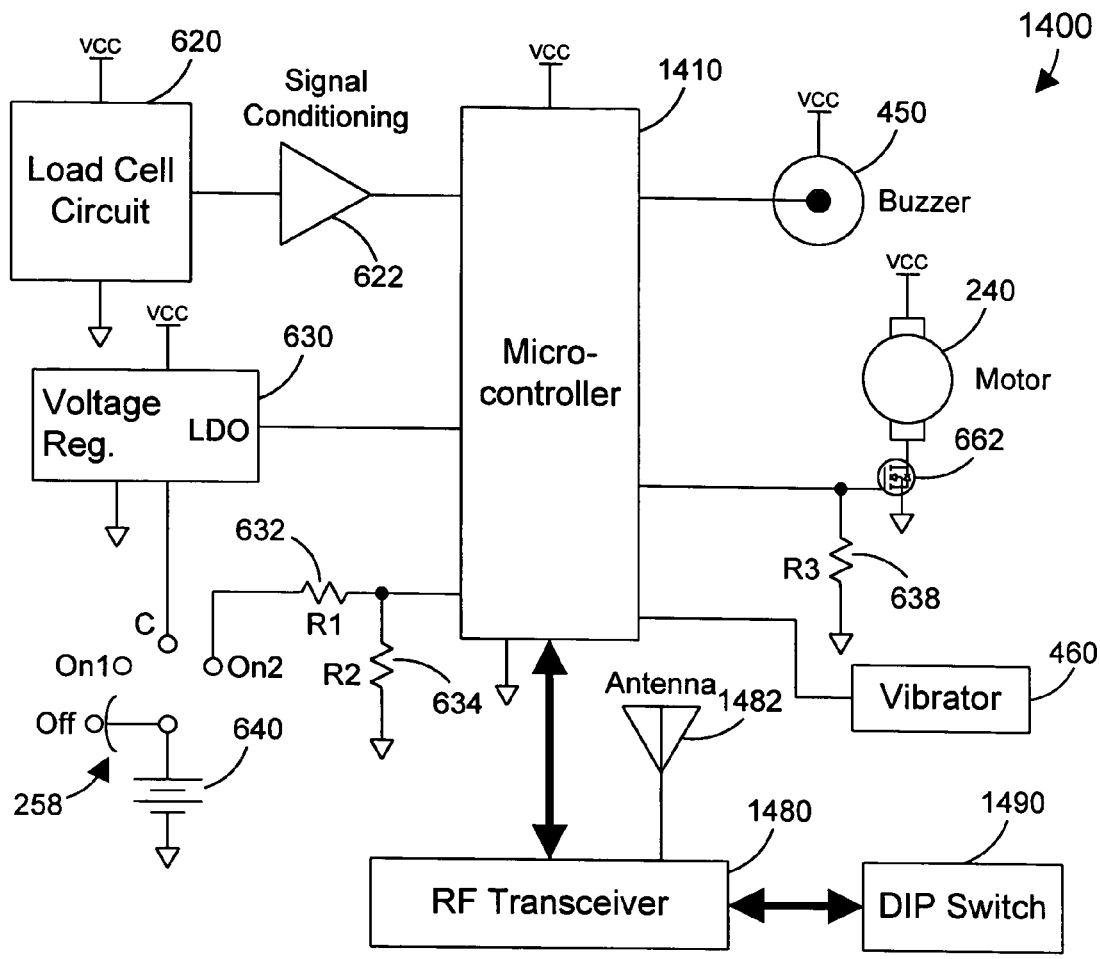
FIG. 14 is a detailed block diagram of an apparatus in accordance with the third embodiment.

A sample detailed implementation in accordance with the third embodiment is shown by apparatus 1400 in FIG. 14. Most of the features of apparatus 1400 are common with apparatus 600 in FIG. 6, and function as explained above with reference to FIG. 6. However, in addition, apparatus 1400 includes an RF transceiver 1480 coupled to microcontroller 1410 for transmitting and receiving wireless messages. RF transceiver 1480 is coupled to a suitable antenna 1482 and to a DIP switch 1490. DIP switch 1490 is of the type commonly found in garage door openers that allow a user to select a code. In the preferred implementation, the wireless remote control 1260 in FIG. 12 will have a DIP switch similar to DIP switch 1490 that allows a user to set the codes the same on the apparatus 1400 and on the wireless remote control 1260. In addition, on switch 258 the On1 position could correspond to an "auto" mode that causes apparatus 100C in FIG. 12 to rotate slowly when birds are present and to rotate fast when a rodent is detected. The On2 position of switch 258 could then correspond to a "remote" mode that causes the apparatus 100C in FIG. 12 to operate the same as in "auto" mode, except that operation may now be preempted or separately controlled via a wireless remote control.

Figure 15:
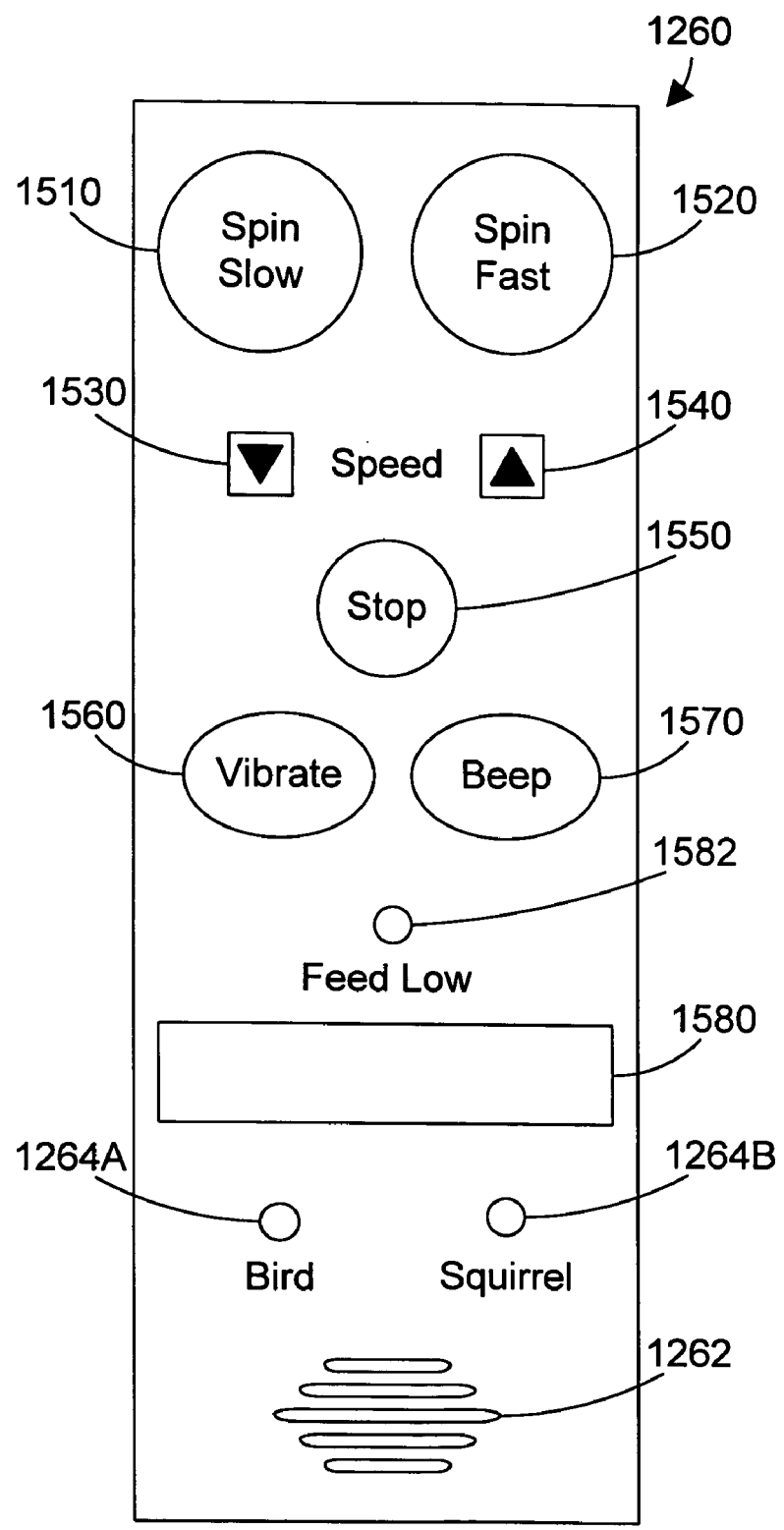
FIG. 15 is a top view of a remote control in accordance with the second and third embodiments.

Referring to FIG. 15, one sample wireless remote control 1260 within the scope of the preferred embodiments is shown. Remote control 1260 preferably includes a spin slow button 1510, a spin fast button 1520, buttons 1530 and 1540 that reduce or increase, respectively, the speed of rotation, a stop button 1550 to stop rotation, a vibrate button 1560 to cause the vibrator in the apparatus to be activated, and a beep button 1570 to cause the buzzer in the apparatus to be activated. In addition, the remote control 1260 includes two light emitting diodes (LEDs) 1264A and 1264B that provide a visual warning when a bird or squirrel, respectively, are on the avian enclosure. Remote control 1260 further includes a speaker, represented by 1262, that provides an audible warning, and that allows the user to hear sounds at the birdhouse or feeder via microphone 1270 (FIG. 12). Remote control 1260 further includes a liquid crystal display (LCD) 1580 that can communicate any desired information to the user. For example, the word "SQUIRREL!" may flash on the LCD display 1580 when a squirrel is detected on the avian enclosure. To avoid losing the remote control 1260, a suction cup could be provided that allows the remote control 1260 to be stuck to a window from which the avian enclosure may be viewed.

A user may press any of the buttons on the wireless remote control 1260 to perform any function, regardless of how the apparatus is currently functioning. For example, let's assume the system 1400 is configured for automatic operation, as shown in method 500 of FIG. 5, with the switch in the On2 position. In this mode, the motor will turn slowly when a bird is detected, and will turn fast when a rodent is detected. Let's assume, however, that the user wants to stop rotation to keep a particular bird in view. The user could simply press the Stop button 1550, which would override the automatic slow rotation and stop the motor. In the alternative, let's assume an undesirable bird, such as a crow, lands on the feeder. The feeder may start to rotate slowly, but the user could press the Spin Fast button 1520 to cause the feeder to be rotated at the fast speed to cause the unwanted bird to leave. In the alternative, the user could press the Vibrate button 1560 and/or the beep button 1570 to scare the unwanted bird away. The system 1400 of the preferred embodiments is very powerful because it allows automatic detection and rotation of an avian enclosure at two different speeds depending on the type of the detected animal, yet also allows a user to override and manually perform any desired function by pressing appropriate buttons on the remote control 1260. Note that remote control 1260 could include other buttons such as alphanumeric keys that allow the user greater flexibility in programming the apparatus 100C in FIG. 12.

Note that remote control 960 shown in FIG. 9 could have all of the features shown in FIG. 12 except for those that require communication from the hanging apparatus 100C. Thus, a remote control 960 would preferably include buttons 1510, 1520, 1530, 1540, 1550, 1560, and 1570 shown in FIG. 15 to remotely control the hanging apparatus 100B in FIG. 9.

The preferred embodiments also allow detecting when a bird feeder is low on feed, and automatically notifying the user. The apparatus can include a calibration routine that allows the user to hang the empty feeder on the apparatus, specify that the feeder is empty, then hang the feeder full of feed on the apparatus, and specify that the feeder is full. The load cell can effectively weigh the empty feeder and the full feeder, and determine the weight of the feed. The user may then specify a predetermined threshold value for feed, such as 10% or 20%. The controller may then notify the user when the feed falls below the specified threshold value. Once the level of feed (as measured by the load cell) falls below the threshold value, a message is sent to the receiver to notify the user that the feed is low in the feeder. A suitable indicator for low feed is shown on remote control 1260 as a light emitting diode 1582. Of course, the words "FEED LOW" could be displayed on the LCD display 1580 when the remote control 1260 receives the message that indicates that the feed level is low. In the alternative, the buzzer 450 may be activated to beep at the feeder to indicate the feed level is low. Automatically notifying a user when more feed is needed eliminates manual checking that is required in the prior art to make sure the feed does not run out.

The down and up speed buttons 1530 and 1540, respectively, allow the user to adjust the speed of rotation. Thus, if a squirrel is resisting jumping off the feeder the user could increase the speed of rotation by pressing and holding the up speed button 1540 until the rotation is at the desired speed. These buttons 1530 and 1540 also allow the user to modify the slow speed specification and fast speed specification in the controller to his or her own preference, if desired. In the alternative, the slow speed specification and fast speed specification could remain at their factory settings, with the user dynamically adjusting the speed of rotation as required using the down and up speed adjustment buttons 1530 and 1540.

Figure 16:
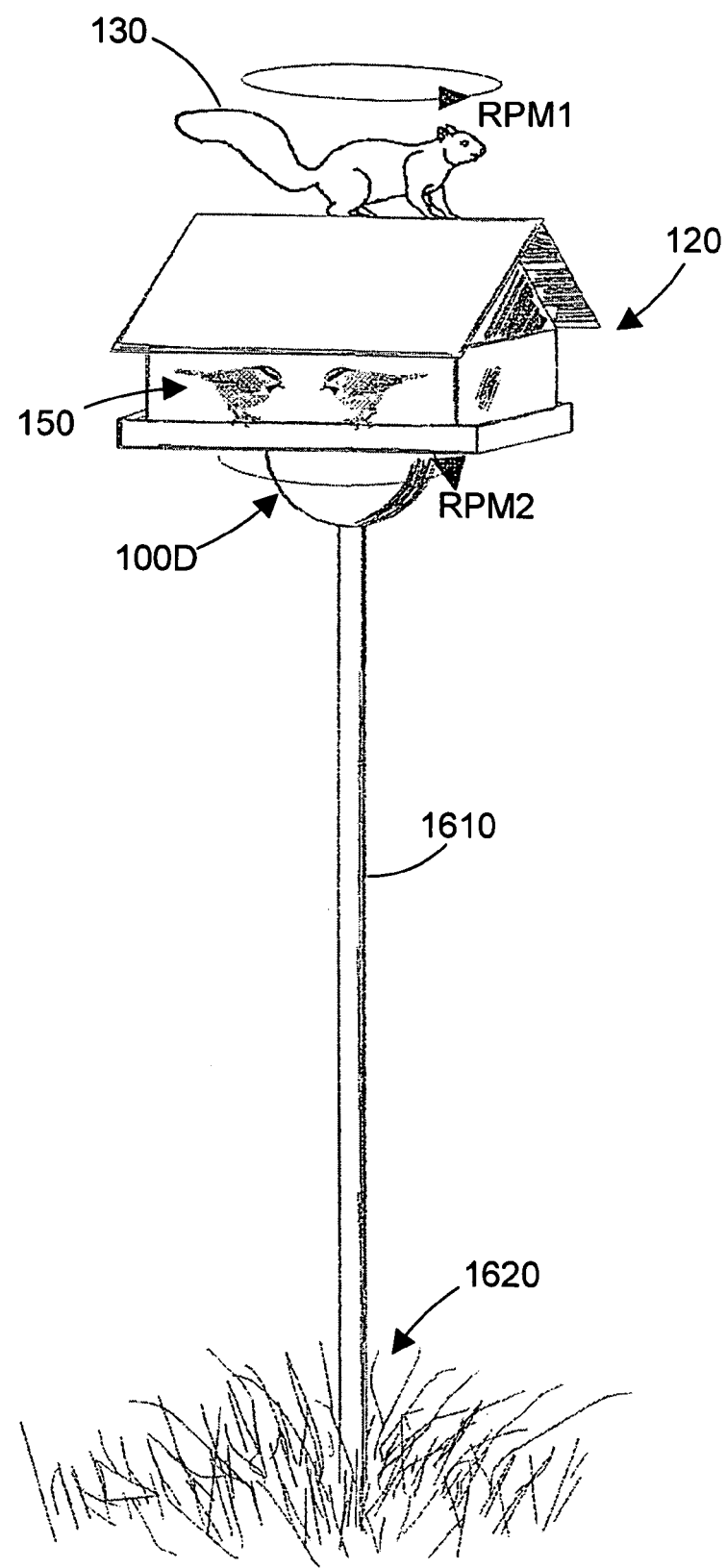
FIG. 16 is a perspective view of an apparatus in accordance with the preferred embodiments mounted to a pole.

Refer now to FIG. 16, which illustrates a perspective view of an alternative version of the present invention, shown mounted onto a pole 1610. A pole-mounted pest deterrent apparatus 100D is shown attached to the top of the pole 1610 whose other end is mounted to a fixed anchor 1620, such as the earth. The birdfeeder 120 is then mounted to the pole-mounted apparatus 100D. When the bottom squirrel 130 is detected, the pole-mounted apparatus 100D will start to rotate the feeder 120 at a speed RPM1 that is sufficiently fast to make the bottom squirrel 130 uncomfortable and want to jump off. Likewise, when the birds 150 are detected, the pole-mounted apparatus 100D will start to rotate the feeder 120 at a speed RPM2 that is sufficiently slow to make the birds 150 comfortable and not want to fly away. The mechanics and electronics for the pole-mounted apparatus 100D are very similar to the hanging apparatus 100 shown in FIG. 1, except the hanging apparatus 100 from FIG. 1 is mounted upside down to the pole 1610 in FIG. 16. The top hook 102 in FIG. 1 would either be attached to or be replaced with a more suitable attachment for the pole 1610 in FIG. 16. Likewise, the hanging apparatus 100 would have its bottom hook 104 in FIG. 1 either attached to or be replaced with a more suitable attachment for a turntable-like device (not shown). The feeder 120 would then be attached to this turntable. Note that the three different embodiments, namely 100A in FIG. 4, 100B in FIG. 9, and 100C in FIG. 12 are specific examples that could be implemented in either physical configuration 100 in FIGS. 1–3 or 100D in FIG. 16.

Figure 17:
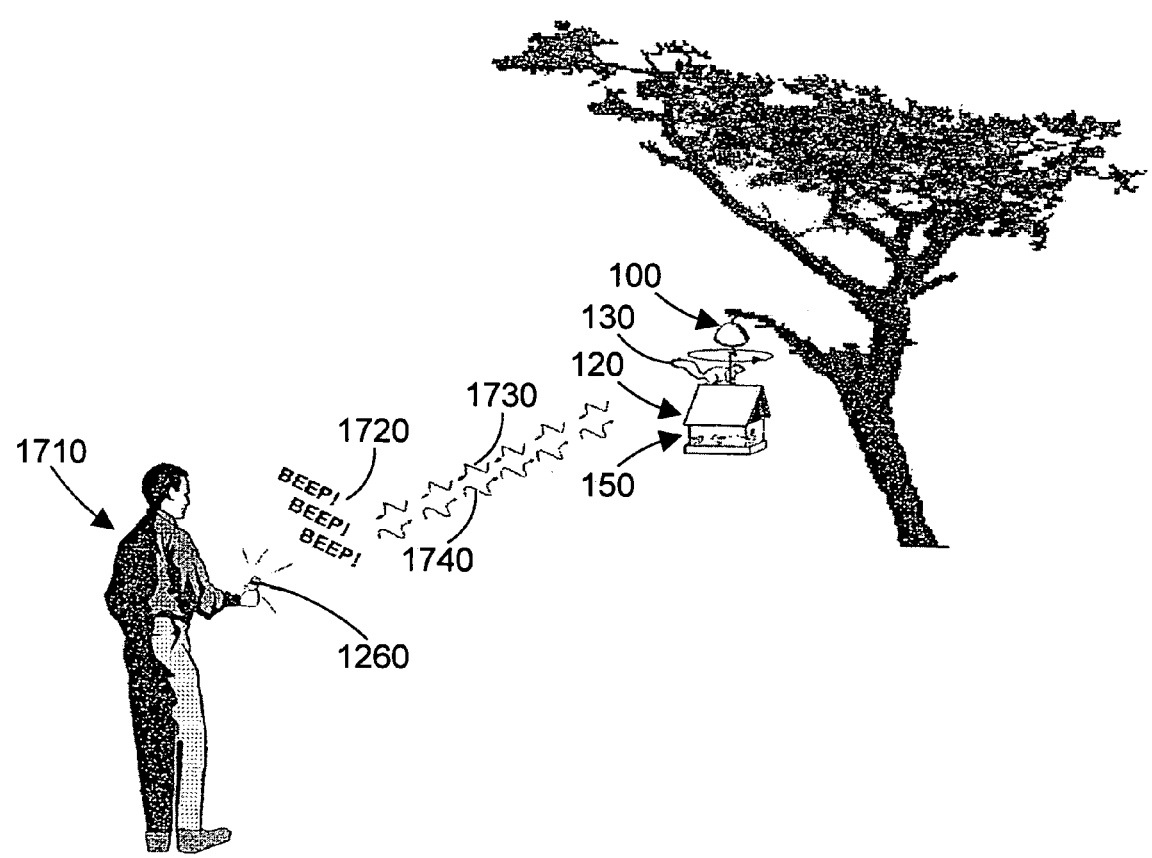
FIG. 17 is a perspective view showing a user controlling the apparatus of the second and third embodiments with a remote control.

Refer now to FIG. 17 that illustrates a perspective view of a remote controlled apparatus within the scope of the third embodiment. A birdwatcher 1710 now has the added control of manually deciding what animals are allowed in their birdfeeder 120 or birdhouse. As a result, when a rodent 130 and/or birds 150 now land on the feeder 120 in FIG. 17, a plurality of non-directional radio frequency signals 1730 are transmitted over the airwaves to wireless remote control 1260 held by the birdwatcher 1710. The remote control 1260 would then process these radio frequency signals 1730 and announce, using a plurality of audio beeps 1720, to the birdwatcher 1710 that something is on their feeder 120. The birdwatcher 1710 then has the flexibility to decide if they want to rotate the feeder at a fast variable speed making the rodent uncomfortable and want to jump off. Or the birdwatcher 1710 could decide to rotate the birdfeeder 120 at a slow variable speed turning the birdfeeder 120 until the birds 150 can be easily seen. In order to accomplish these tasks, the remote control 1260 would send, with the press of a button, a plurality of directional infrared signals 1740 back to the hanging apparatus 100 in FIG. 1 or the pole mounted apparatus 100D in FIG. 16.

While the invention has been particularly shown and described with reference to preferred embodiments thereof, it will be understood by those skilled in the art that various changes in form and details may be made therein without departing from the spirit and scope of the invention. For example, the battery or batteries could be replaced with solar panels or with a hard-wired power source. In addition, the apparatus 100 and 100D could be incorporated into the structure of a feeder or birdhouse. Specifically, the avian enclosures could be manufactured with all of the necessary electronic and mechanical components contained inside the enclosure. The apparatus 100 and 100D could include a tachometer or other rotational sensor to monitor the rotation of the avian enclosure, and could then adjust the drive to the motor to compensate for the lower voltage that results from batteries being discharged. In addition, any suitable number of thresholds may be used within the scope of the preferred embodiments. For example, three ranges that correspond to small birds, big birds, and rodents could be defined. The present invention expressly extends to any and all suitable thresholds that allow the apparatus to change its function based on detecting two or more different types of animals.

The invention claimed is:

1. A method for controlling an avian enclosure using an apparatus removably coupled to the avian enclosure, the method comprising the steps of:
   (A) transmitting via wireless communication at least one message to the apparatus coupled to the avian enclosure; and
   (B) the apparatus receiving the at least one message, and in response thereto, performing to the avian enclosure at least one action corresponding to the received message.

2. The method of claim 1 wherein the at least one action comprises rotating the avian enclosure at a first speed.

3. The method of claim 2 wherein the at least one action comprises rotating the avian enclosure at a second speed.

4. The method of claim 1 wherein the at least one action comprises stopping rotation of the avian enclosure.

5. The method of claim 1 wherein the at least one action comprises changing the speed of rotation of the avian enclosure.

6. The method of claim 1 wherein the at least one action comprises creating a sound on an audio device.

7. The method of claim 1 wherein the at least one action comprises activating a vibrator.

8. A method for controlling an avian enclosure, the method comprising the steps of:

(A) transmitting via wireless communication at least one message to an apparatus coupled to the avian enclosure; and
(B) the apparatus receiving the at least one message, and in response thereto, performing an action selected from the group consisting of:
rotating the avian enclosure at a first speed;
rotating the avian enclosure at a second speed;
stopping rotation of the avian enclosure;
changing speed of rotation of the avian enclosure;
sounding an audio device; and
activating a vibrator.

9. A method for controlling an avian enclosure, the method comprising the steps of:
transmitting via wireless communication a first message to an apparatus coupled to the avian enclosure;
the apparatus receiving the first message, and in response thereto, the apparatus rotating the avian enclosure at a first speed;
transmitting via wireless communication a second message to the apparatus;
the apparatus receiving the second message, and in response thereto, the apparatus rotating the avian enclosure at a second speed;
transmitting via wireless communication a third message to the apparatus;
the apparatus receiving the first message, and in response thereto, the apparatus stopping rotation of the avian enclosure;
transmitting via wireless communication a fourth message to the apparatus; and
the apparatus receiving the fourth message, and in response thereto, the apparatus changing speed of rotation of the avian enclosure.

10. The method of claim 9 further comprising the steps of:
transmitting via wireless communication a fifth message to the apparatus; and
the apparatus receiving the fifth message, and in response thereto, the apparatus sounding an audio device near the avian enclosure.

11. The method of claim 9 further comprising the steps of:
transmitting via wireless communication a sixth message to the apparatus; and
the apparatus receiving the sixth message, and in response thereto, the apparatus activating a vibrator on the avian enclosure.

* * * * *